Dec. 1, 1936.  S. A. SNELL  2,062,768
LEVER
Filed April 30, 1932
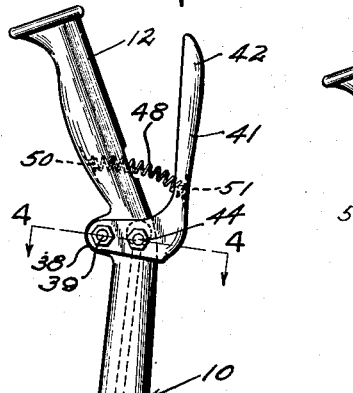
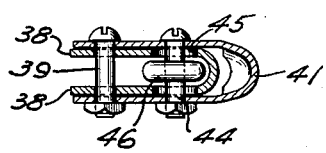
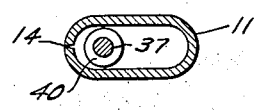
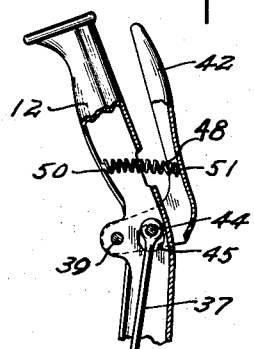
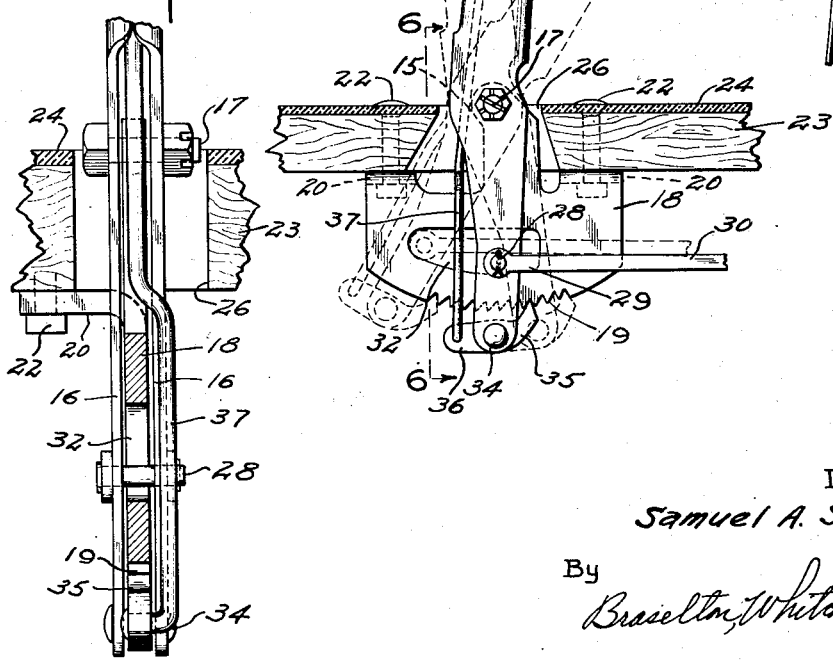
Inventor
Samuel A. Snell
By
Braselton, Whitcomb Davis
Attorneys Patented Dec. 1, 1936

2,062,768

UNITED STATES PATENT OFFICE 2,062,768

LEVER

Samuel A. Snell, Toledo, Ohio, assignor to The Bingham Stamping & Tool Company, Toledo, Ohio, a corporation of Ohio Application April 30, 1932, Serial No. 608,399

3 Claims. (Cl. 74—537)

This invention relates to levers and particularly to those levers of the type utilized for the controls of an automotive vehicle or other mechanism.

The invention has for an object the provision of a lever of this character which may be stamped from a sheet of material and subsequently formed into desired configuration whereby the costs of assembly are substantially decreased.

The invention also embraces the provision of a lever formed from sheet material incorporating a simple and effective means for retaining or locking the lever in desired operative position as well as means for easily and quickly releasing the locking means.

The invention contemplates the use of a supplemental lever as a lock releasing operating means in combination with a hollow lever formed of sheet metal.

An object of the invention is the provision of novel means for mounting the lever upon a part of the vehicle, as for example, floor boards or portions of the chassis or frame construction.

A further object is the provision of a mounting for a lever used as a control member in the vehicle wherein the opening in the lever supporting portion of the vehicle accommodating and providing the operating space for the lever may be reduced to a minimum.

Further objects and advantages are within the scope of this invention such as relate to the arrangement, operation and function of the related elements of the structure, to various details of construction and to combination of parts, elements per se, and to economies of manufacture and numerous other features as will be apparent from a consideration of the specification and drawings of certain forms of the invention, which may be preferred, in which:

Figure 1 is a side elevational view of a lever of my invention particularly illustrating the mounting means therefor, the locking means and the lock releasing means;

Figure 2 is a fragmentary view of the upper portion of the lever, certain parts being shown in section and illustrating in detail the lever lock releasing means;

Figure 3 is a view similar to Figure 2 showing the lever lock releasing means in releasing position;

Figure 4 is an enlarged transverse sectional view taken on the line 4—4 of Figure 1;

Figure 5 is a transverse sectional view taken substantially on the line 5—5 of Figure 1;

Figure 6 is a sectional view taken substantially on the line 6—6 of Figure 1.

While I have illustrated a form of the lever of my invention as particularly adapted for use in the control of braking mechanism of an automotive vehicle, it is to be understood that I do not wish to limit the invention to the particular disclosure illustrated and that I contemplate its use wherever the same may be found to be applicable.

Referring to the drawing in detail, the lever 10 comprises a hollow body portion 11 and a hollow handle portion 12 being integrally formed and blanked or stamped from a flat sheet of metal or other suitable material, the stamped configuration being subsequently formed into a substantially tubular formation. The body portion 11 of the lever in the embodiment illustrated is substantially oval in cross section as particularly indicated in Figure 5, while the handle portion 12 is preferably of circular contour in cross section. In forming the lever to the configuration particularly illustrated in Figure 5, the edges of the blank are abutted as at 14 to form a substantially closed seam which will remain closed without the necessity of welding or use of other securing means, the inherent stress of the metal being sufficient to maintain such closure yet providing a rigid and durable construction. The lower portion of the lever body 11 is formed with oppositely disposed leg portions 16 which are provided with aligned openings to receive a pivot pin or bolt 17 forming the fulcrum for the lever, the bolt 17 passing through an opening in an upwardly extending portion 15 of a supporting bracket 18 the depending leg portions 16 straddling a portion of the member 18, the latter having an arcuate or sector-like surface serrated as at 19. The supporting member or bracket 18 is provided with a pair of laterally projecting ears 20, having openings adapted to receive bolts 22 for fixedly securing the bracket to the vehicle floor board 23 or other suitable part of the vehicle frame structure.

In the embodiment illustrated, the floor board 23 is fabricated of wood having an upper lining 24 of metal, but it is to be understood that in installations where metal floor elements only are used, the bracket 18 may be secured directly thereto. It should be noted that the lever body 11 projects through an opening 26 in the floor board, and as the pivotal point or fulcrum 17 of the lever 11 is in substantial alignment with the upper uniplanar surface of the floor board, the opening 26 need only allow slight clearance to accommodate the lever, as there is no lateral movement of the lever at this point by reason of the particular positioning of the pivotal support for the lever. In this form of lever mounting, the usual clearance opening in the floor board to accommodate movement of the lever may be dispensed with, thus substantially eliminating the entrance of cold air, dust and other foreign matter into the vehicle body at this point.

The depending portions 16 are provided with another set of aligned openings adapted to receive a pin 28, this pin also passing through a connecting yoke 29, adapted in the embodiment shown, for pivotally connecting the brake rod 30 to the lever. The bracket 18 is provided with a comparatively large aperture 32 to accommodate the pin 28 in any adjusted position of the lever.

The portions of the depending legs 16 of the lever body extending below the serrated surface 19 of the bracket 18 are provided with aligned openings to receive a pin 34, which pin forms a pivotal support for a pawl or suitable lever locking member 35, one end of the pawl cooperating with serrations 19 of the bracket 18 to hold the lever in adjusted positions.

A projecting extremity 36 of the pawl 35 is connected to an operating rod 37 which extends upwardly through the hollow body portion of the lever and terminates at a point adjacent the lower extremity of the handle portion 12. Surrounding the rod 37 is a member or bushing 40 preferably of non-metallic material, as for example, rubber, which serves to dampen vibrations of the rod which might be caused by rod irregularities, engine vibrations and the like by preventing engagement of the rod directly with the inner walls of the lever body. At this termination of the operating rod 37, the lever body is formed with a pair of laterally projecting ears 38 having openings therein to receive a pivot pin 39 which may be a bolt, rivet or other suitable member. Pivoted upon the bolt 39 is a substantially L-shaped rod actuating member 41 preferably formed of sheet metal, the upwardly extending portion 42 thereof being of concave or "spoon-like" formation. This concave formation not only improves the appearance of the actuating member, but also enables a better "grip" to be had upon the member by the operator. The horizontal portions of the member 41 have aligned apertures which receive a pin 44, the latter passing through openings 45 in the walls of the body portion 11 of the lever and also through an eye 46 formed on the upper end of the pawl operating rod 37. The openings 45 in the walls of the lever may be of either circular or longitudinal formation, but the uppermost walls of the openings are preferably utilized to form a stop means to prevent the actuating member 42 of the releasing mechanism to come into engagement with the handle portion 12 of the lever, Figure 3 particularly illustrating the relative location of the actuating member 41 with respect to the handle portion 12 of the lever in releasing position with the pin 44 in contact with the upper walls of openings 45. In order to normally urge the pawl 35 into locking engagement with the serrations 19 of the bracket 18, an expansive spring member 48 is arranged between two projections 50 and 51 formed upon or carried by the handle portion 12 and the pawl rod actuating member 41 respectively, the projections 50 and 51 serving to prevent a derangement of the spring member.

In the operation of my device, as illustrated particularly in Figure 1 in full lines, the lever is substantially in brake releasing position with the pawl 35 in engagement with one of the serrations 19 of the bracket 18, the spring 48 serving to urge the grip or handle portion 42 of the pawl rod actuating member 41 away from the handle portion 12 of the lever, as illustrated in Figure 2, with the pin 44 at its lowermost position. The lever may be moved to brake setting position shown in dotted lines in Figure 1 by imparting a clockwise movement to the lever. Due to the particular formation of serrations 19 in bracket 18, it is not essential that the grip member 42 be manually moved toward the handle member 12 when the brakes are to be moved to "set" position, as the pawl 35, upon clockwise movement of the lever about its fulcrum, rides progressively over the teeth formed by the serrations 19, and when the lever has been moved to desired position the pawl 35 engages the proper serration in the bracket 18 to prevent the release of the brakes or other mechanism with which my invention may be used.

When it is desired to release the brake or other mechanism, the pawl rod actuating member 41 is gripped by the operator and moved to the position with respect to the handle 12 illustrated in Figure 3, thus elevating the operating rod 37, causing a clockwise pivotal movement of pawl 35 about the pin 34. This movement withdraws the pawl 35 out of the path of the serrated portion 19 of bracket 18, after which the lever may be freely moved about its fulcrum pin 17 to releasing or other desired position.

It is apparent that, within the scope of the invention modifications and different arrangements may be made other than is herein disclosed, and the present disclosure is illustrative merely, the invention comprehending all variations thereof.

What I claim is:

1. In a brake lever the combination of a hollow sheet metal member having a tubular body portion and a tubular handle portion, said tubular handle portion being angularly arranged with respect to said body portion and having an opening in one wall thereof; a pair of ears integral with the sheet metal member and projecting from the junction of said body and handle portions; a rod within said hollow body portion; an operating element for said rod having portions straddling said hollow member and being pivotally connected to said ears; and a spring between said handle portion and said operating element, said spring extending through the opening in said handle portion.

2. In a brake lever the combination of a hollow sheet metal member having a tubular body portion and a tubular handle portion, said tubular handle portion having a projection formed interiorly thereof, and having an opening in one of its walls; a rod within said hollow body portion; an operating element for said rod having portions straddling said hollow member and being pivotally connected thereto, said operating element having a projection integral therewith; and a spring between the projections of said handle portion and said operating element, said spring extending through the opening in said handle portion.

3. In a brake lever of a combination of a hollow sheet metal member having a tubular body portion and a tubular handle portion, said handle portion being angularly arranged with respect to said body portion; one end of the body portion of said lever terminating in a bifurcated configuration; a pawl pivoted to the bifurcated portion of said lever; a rod positioned within the hollow body portion of the lever and operatively connected to said pawl; a pair of ears formed integral with the sheet metal member and projecting from the juncture of said body and handle portions; a pawl operating lever pivoted upon said projecting ears; a transversely extending pin carried by said pawl operating lever extending through registering openings in the side walls of said body portion, said rod being connected to said pin within said lever body; and spring means interposed between handle portion and said pawl operating lever for urging the rod in one direction.

SAMUEL A. SNELL.